US012388222B2

(12) United States Patent
Tatsumi

(10) Patent No.: US 12,388,222 B2
(45) Date of Patent: Aug. 12, 2025

(54) CONNECTOR HAVING VIBRATION ABSORPTION AND NOISE REMOVAL PROPERTIES

(71) Applicant: Mitsubishi Electric Corporation, Tokyo (JP)

(72) Inventor: Masayuki Tatsumi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 244 days.

(21) Appl. No.: 17/970,748

(22) Filed: Oct. 21, 2022

(65) Prior Publication Data

US 2023/0043321 A1 Feb. 9, 2023

Related U.S. Application Data

(63) Continuation of application No. PCT/JP2020/025049, filed on Jun. 25, 2020.

(51) Int. Cl.

*H01R 13/719* (2011.01)
*H01R 13/15* (2006.01)
*H01R 13/533* (2006.01)
*H01R 24/40* (2011.01)

(52) U.S. Cl.

CPC ........... *H01R 13/719* (2013.01); *H01R 13/15* (2013.01); *H01R 13/533* (2013.01); *H01R 24/40* (2013.01)

(58) Field of Classification Search

CPC .... H01R 13/719; H01R 13/15; H01R 13/533; H01R 24/40; H01R 13/7197; H01R 24/42
See application file for complete search history.

(56) References Cited

U.S. PATENT DOCUMENTS

| | | | | |
|---|---|---|---|---|
| 6,547,596 B1 * | 4/2003 | Pavlovic | ............ | H01R 13/7197 336/100 |
| 2005/0282433 A1 | 12/2005 | Pixley et al. | | |
| 2010/0078992 A1 | 4/2010 | Landry et al. | | |
| 2018/0234003 A1 | 8/2018 | Frank et al. | | |

FOREIGN PATENT DOCUMENTS

| | | |
|---|---|---|
| DE | 11 2009 002 055 T5 | 6/2011 |
| DE | 10 2010 014 940 A1 | 10/2011 |
| JP | 53-78701 | 7/1978 |
| JP | 2004-47296 A | 2/2004 |
| JP | 2006165190 A * | 6/2006 |
| JP | 2011-243772 A | 12/2011 |
| JP | 2015-216088 A | 12/2015 |

(Continued)

OTHER PUBLICATIONS

International Search Report (PCT/ISA/210), issued in PCT/JP2020/025049, dated Sep. 15, 2020.

(Continued)

*Primary Examiner* — Travis S Chambers
(74) *Attorney, Agent, or Firm* — Birch, Stewart, Kolasch & Birch, LLP

(57) ABSTRACT

A connector includes a spring structure having a vibration absorption property and an inductance component having noise removal properties. One end of the spring structure is configured to be connected to a wiring pattern provided on a board via a support member, and an opposite end of the spring structure is configured to be connected to an electric wire via a connector.

4 Claims, 4 Drawing Sheets

(56) References Cited

FOREIGN PATENT DOCUMENTS

| | | | |
|---|---|---|---|
| JP | 2018-137434 | A | 8/2018 |
| JP | 2019-213186 | A | 12/2019 |

OTHER PUBLICATIONS

Written Opinion of the International Searching Authority (PCT/ISA/237), issued in PCT/JP2020/025049, dated Sep. 15, 2020.
German Office Action for German Application No. 11 2020 007 072.7, dated Oct. 6, 2023, with English translation.
Chinese Office Action dated May 27, 2025 issued in corresponding Chinese Application No. 202080102160.0, with Enlgish Translation.

* cited by examiner

CONNECTOR HAVING VIBRATION ABSORPTION AND NOISE REMOVAL PROPERTIES

CROSS REFERENCE TO RELATED APPLICATIONS

This application is a Continuation of PCT International Application No. PCT/JP2020/025049, filed on Jun. 25, 2020, which is hereby expressly incorporated by reference into the present application.

TECHNICAL FIELD

The present disclosure relates to a connector.

BACKGROUND ART

Connectors are parts for connecting a flow of power or electric signals. Such a connector electrically connects an electric wire and electronic equipment, for example. Therefore, there is a case in which an electrical noise is transmitted from the electric wire to the electronic equipment via the connector. In this case, the electronic equipment to which the noise is propagated has a possibility of malfunctioning.

In Patent Literature 1, a technique of reducing noises propagated to electronic equipment is described. The technique disclosed in Patent Literature 1 reduces a noise propagated to electronic equipment by providing a coiled conducting wire between the electric equipment and a coaxial cable.

CITATION LIST

Patent Literature

Patent Literature 1: Japanese Unexamined Patent Application Publication No. JP S 53-78701 A

SUMMARY OF INVENTION

Technical Problem

A connector electrically connects between an electric wire and electronic equipment, and also connects between them mechanically. Therefore, there is a case in which a mechanical vibration is transmitted either from the electric wire to the electronic equipment or from the electronic equipment to the electric wire. In this case, there is a possibility that either the electronic equipment or the connector gets damaged. It is impossible for the technique disclosed in Patent Literature 1 to absorb mechanical vibrations.

The present disclosure is made in order to solve the above-mentioned problems, and it is therefore an object of the present disclosure to provide a connector that can achieve both the absorption of vibrations and the removal of noises using a single spring structure.

Solution to Problem

A connector according to the present disclosure includes: a spring structure having a spring property as a result of being constituted by a conducting wire wound spirally, and functioning as a coil having an inductance component; a one end side support member to support one end of the spring structure, and to connect the one end of the spring structure to a wiring pattern provided on a board; and an other end side support member to support the other end of the spring structure, and to electrically connect the other end of the spring structure to an electric wire, in which the spring structure is constituted by a pair of conducting wires wound spirally and alternately each other, one ends of the pair of conducting wires are connected to a pair of respective wiring patterns provided on the board, the other ends of the pair of conducting wires are connected to a pair of respective electric wires contained in a single cable, the pair of conducting wires are provided coaxially and in a same winding direction, and an insulator is provided on each of outer peripheral surfaces of the pair of conducting wires.

Advantageous Effects of Invention

According to the present disclosure, both the absorption of vibrations and the removal of noises can be achieved using a single spring structure.

DESCRIPTION OF EMBODIMENTS

Hereinafter, in order to explain the present disclosure in greater detail, embodiments of the present disclosure will be explained with reference to the accompanying drawings.

Embodiment 1

A connector 10 according to Embodiment 1 will be explained using FIGS. 1 to 3.

Figure 1:
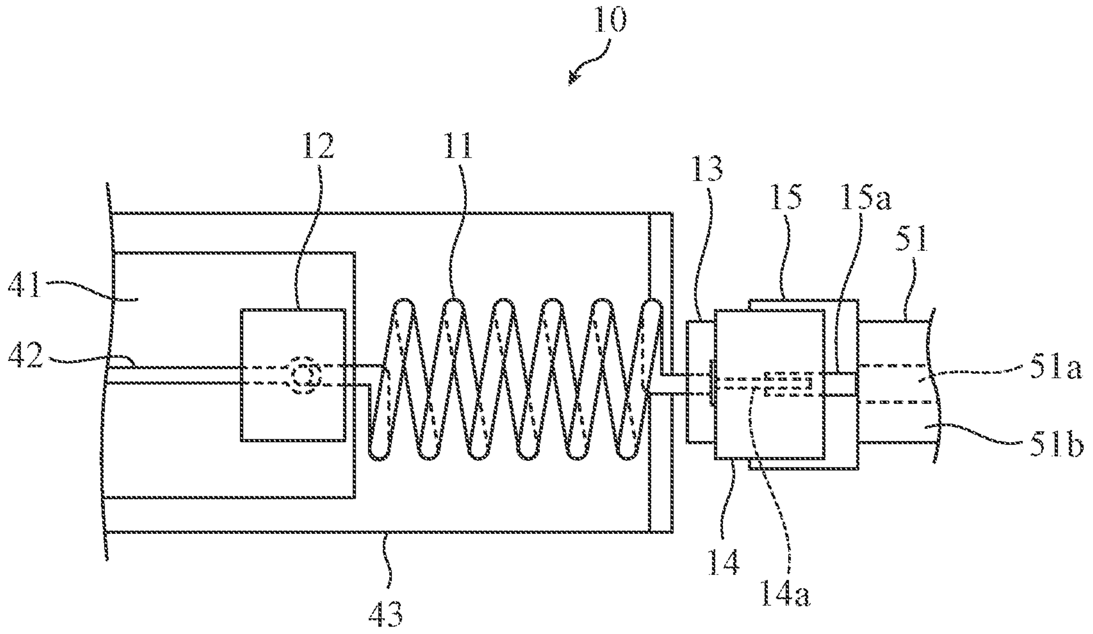
FIG. 1 is a plane view showing the configuration of a connector according to Embodiment 1.

FIG. 1 is a plane view showing the configuration of the connector 10 according to Embodiment 1. FIG. 2 is a side view showing the configuration of the connector 10 according to Embodiment 1. FIG. 3 is a view showing a state in which the connector 10 according to Embodiment 1 and an electric wire 51 are not connected mechanically and electrically.

Figure 2:
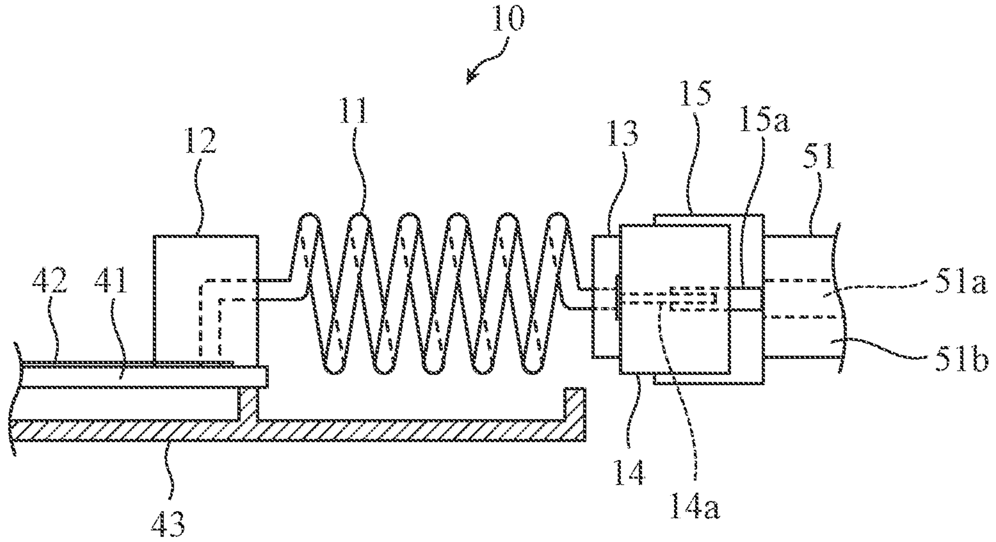
FIG. 2 is a side view showing the configuration of the connector according to Embodiment 1.

As shown in FIGS. 1 and 2, the connector 10 according to Embodiment 1 mechanically and electrically connects a single board 41 and the single electric wire 51, for example. One end of the connector 10 is mechanically and electrically connected to the board 41, and the other end of the connector 10 is mechanically and electrically connected to the electric wire 51.

The board 41 has a single wiring pattern 42. This wiring pattern 42 is formed of, for example, copper or the like, and is provided on an upper surface of the board 41. Further, the board 41 is fixed to a housing 43 of electronic equipment (not illustrated). More specifically, the board 41 is intended for controlling the electronic equipment.

The electric wire 51 is the one in which a signal line 51*a* serving as a conductor is covered by an insulator 51*b*. To one end of this electric wire 51 is provided a socket 15 which will be mentioned later.

The connector 10 includes a spring structure 11, supporting members 12 and 13, a plug 14 and the socket 15.

The spring structure 11 is supported between the support members 12 and 13. This spring structure 11 has a function of absorbing mechanical vibrations and a function of removing electrical noises.

Concretely, the spring structure 11 is the one in which a single conducting wire is spirally wound. Therefore, the spring structure 11 has a spring property. More specifically, the spring structure 11 can be elastically deformed in an axis direction thereof. The spring structure 11 also functions as a coil having an inductance component.

The conducting wire has, for example, a circular cross section, but its cross section may have an elliptic shape, a rectangular shape or another shape. Further, the spring structure 11 is constituted by a conducting wire wound spirally, and, as a result, its cross section is a circle. In addition, as for the conducting wire which constitutes the spring structure 11, a metal having high tensile strength and high electrical conductivity is suitable. The conducting wire is formed of, for example, at least one metallic material out of aluminum, copper, nickel, silver, etc.

The supporting member 12 constitutes a one end side support member. This supporting member 12 is formed of, for example, an insulator. The supporting member 12 supports one end of the spring structure 11. The one end of the spring structure 11 penetrates the supporting member 12. Further, the supporting member 12 is fixed to the upper surface of the board 41 in such a way as to cover one end of the wiring pattern 42. Then, the one end of the spring structure 11, the one end penetrating the supporting member 12, and the one end of the wiring pattern 42, the one end being covered by the supporting member 12, are connected.

The supporting member 13 constitutes an other end side supporting member. This supporting member 13 is formed of, for example, an insulator. The supporting member 13 supports the other end of the spring structure 11. The other end of the spring structure 11 penetrates the supporting member 13.

The plug 14 is provided for the support member 13. This plug 14 has a connection portion 14*a* in the inside thereof. This connection portion 14*a* is connected to the other end of the spring structure 11, the other end penetrating the support member 13. On the other hand, the socket 15 is provided for the one end of the electric wire 51. This socket 15 has a connection portion 15*a*. This connection portion 15*a* is provided in a receptacle of the socket 15. Then, the plug 14 can be inserted into the receptacle of the socket 15. Further, the connection portion 14*a* of the plug 14 and the connection portion 15*a* of the socket 15 can be in contact with each other.

Figure 3:
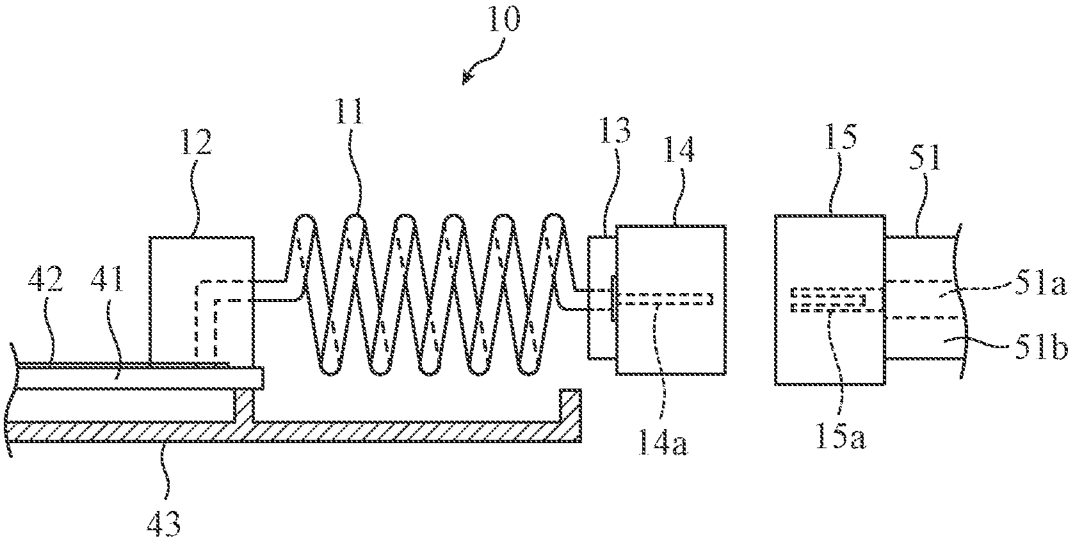
FIG. 3 is a view showing a state in which the connector according to Embodiment 1 and an electric wire are not connected mechanically and electrically.

More specifically, when the plug 14 is inserted into the inside of the socket 15, the connection portion 14*a* of the plug 14 and the connection portion 15*a* of the socket 15 are brought into contact with each other, as shown in FIGS. 2 and 3. In contrast with this, when the plug 14 is withdrawn from the inside of the socket 15, the spring structure 11 enters a state in which the spring structure is mechanically and electrically connected to the board 41 while enters a state in which the spring structure is not mechanically and electrically connected to the electric wire 51.

At the time of insertion of the plug 14 into the socket 15, when a vibration occurs in the housing 43 and the vibration propagates from the housing 43, via the spring structure 11, toward the electric wire 51, the vibration is attenuated by the elastic deformation of the spring structure 11. On the other hand, at the time of insertion of the plug 14 into the socket 15, when a vibration occurs in the electric wire 51 and the vibration propagates from the electric wire 51, via the spring structure 11, toward the housing 43, the vibration is attenuated by the elastic deformation of the spring structure 11.

Further, at the time of insertion of the plug 14 into the socket 15, when a noise occurs in the wiring pattern 42 of the board 41 and the noise propagates from the wiring pattern 42, via the spring structure 11, toward the signal line 51*a* of the electric wire 51, the noise is removed by the inductance component of the spring structure 11. On the other hand, when a noise occurs in the signal line 51*a* of the electric wire 51 and the noise propagates from the signal line 51*a*, via the spring structure 11, toward the wiring pattern 42, the noise is removed by the inductance component of the spring structure 11.

As mentioned above, the connector 10 according to Embodiment 1 includes: the spring structure 11 having a spring property as a result of being constituted by a conducting wire wound spirally, and functioning as a coil having an inductance component; the support member 12 on a one end side to support the one end of the spring structure 11, and to connect the one end of the spring structure 11 to the wiring pattern 42 provided on the board 41; and the support member 13 on an other end side to support the other end of the spring structure 11, and to electrically connect the other end of the spring structure 11 to the electric wire 51. Therefore, the connector 10 can achieve both the absorption of vibrations and the removal of noises using the single spring structure 11.

Further, the connector 10 includes the plug 14 provided for the support member 13 and connected to the other end of the spring structure 11, and the socket 15 which is provided for the electric wire 51 and into which the plug 14 can be inserted. Therefore, the connector 10 makes it easy to make a mechanical connection and an electrical connection to the electric wire 51.

Embodiment 2

A connector 20 according to Embodiment 2 will be explained using FIGS. 4 to 6. Components having the same functions as those of components explained in the connector 10 according to Embodiment 1 are denoted by the same reference signs, and an explanation of the components will be omitted.

Figure 4:
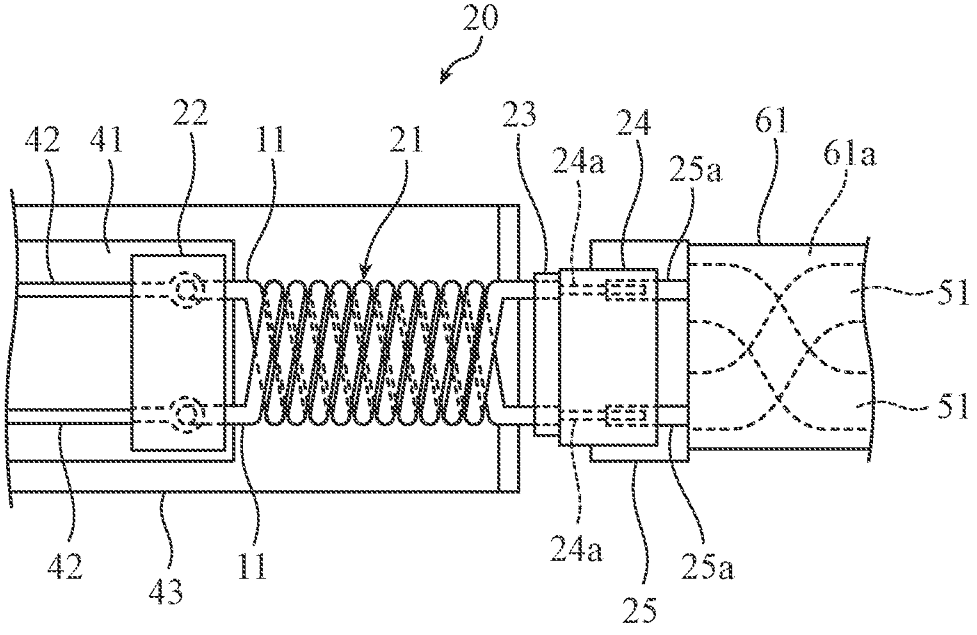
FIG. 4 is a plane view showing the configuration of a connector according to Embodiment 2.

FIG. 4 is a plane view showing the configuration of the connector 20 according to Embodiment 2. FIG. 5 is a side view showing the configuration of the connector 20 according to Embodiment 2. FIG. 6A is an outline view showing a double spring structure 21 which is viewed from an axis direction thereof. FIG. 6B is an outline view showing the double spring structure 21 which is viewed from the outside in a radial direction thereof.

Figure 5:
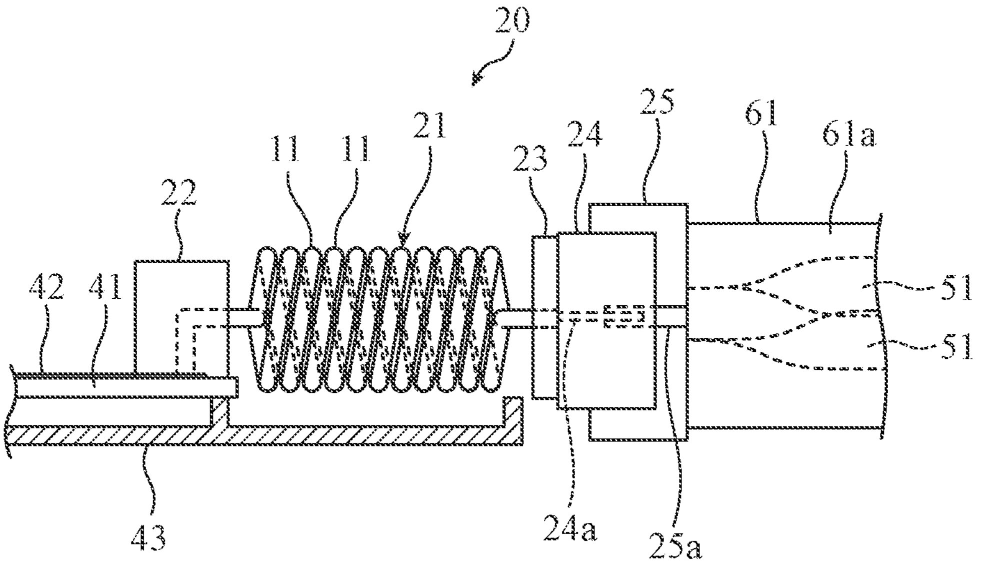
FIG. 5 is a side view showing the configuration of the connector according to Embodiment 2.
Figure 6A:
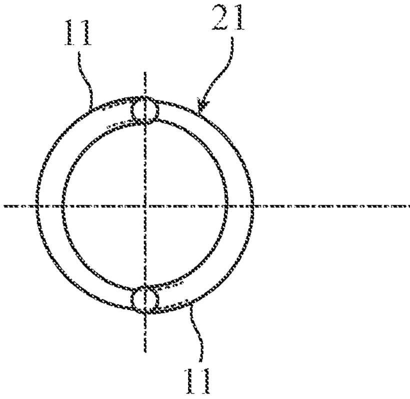
FIG. 6A is an outline view showing a double spring structure which is viewed from an axis direction thereof.
Figure 6B:
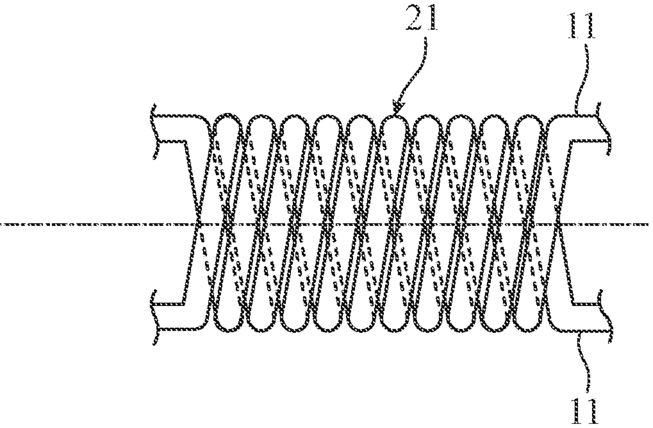
FIG. 6B is an outline view showing the double spring structure which is viewed from the outside in a radial direction thereof.

As shown in FIGS. 4 and 5, the connector 20 according to Embodiment 2 electrically connects a single board 41 and a single cable 61 by means of a pair of transmission lines, for example. One end of the connector 20 is mechanically and electrically connected to the board 41, and the other end of the connector 20 is mechanically and electrically connected to the cable 61.

The board 41 has a pair of wiring patterns 42. These wiring patterns 42 are arranged in parallel.

The cable 61 is the one in which a pair of electric wires 51 are covered by a sheath 61*a*, for example. The sheath 61*a* is formed of, for example, a resin material. At one end of the cable 61 is disposed a socket 25.

The connector 20 includes the spring structure 21, support members 22 and 23, a plug 24 and the socket 25.

The spring structure 21 is supported between the support members 22 and 23. This spring structure 21 has a function of absorbing mechanical vibrations and a function of removing electrical noises.

Concretely, as shown in FIGS. 6A and 6B, the spring structure 21 is the one in which two spring structures 11 are superposed on each other. In other words, the spring structure 21 is constituted by a pair of conducting wires wound spirally and alternately each other. Thus, the pair of conducting wires which form a double helix structure are provided coaxially and in the same winding direction, and each of the outer peripheral surfaces of the pair of conducting wires is covered with an insulator (not illustrated).

Therefore, the spring structure 21 has a spring property. More specifically, the spring structure 21 can be elastically deformed in an axis direction thereof. The spring structure 21 also functions as a coil having an inductance component. In addition, because the outer peripheral surface of each of the conducting wires is covered with an insulator, the spring structure 21 is placed in a state in which the conducting wires do not conduct with each other even though the conducting wires come into contact with each other.

The insulator provided on the outer peripheral surface of each of the conducting wires has elasticity. Therefore, even though the pair of conducting wires in the spring structure 21 are elastically deformed, the insulator can follow the elastic deformation.

The support member 22 constitutes a one end side support member. This support member 22 is formed of, for example, an insulator. The support member 22 supports each of one ends of the pair of conducting wires in the spring structure 21. More specifically, the support member 22 supports one end of each of the spring structures 11. Each of the one ends of the pair of conducting wires in the spring structure 21 penetrates the support member 22.

Further, the support member 22 is fixed to an upper surface of the board 41 in such a way as to cover each of one ends of the pair of wiring patterns 42. Then, the one end of one of the conducting wires, the one end penetrating the support member 22, and the one end of one of the wiring patterns 42, the one end being covered by the support member 22, are connected. On the other hand, the one end of the other conducting wire, the one end penetrating the support member 22, and the one end of the other wiring pattern 42, the one end being covered by the support member 22, are connected.

The support member 23 constitutes an other end side support member. This support member 23 is formed of, for example, an insulator. The support member 23 supports each of other ends of the pair of conducting wires in the spring structure 21. More specifically, the support member 23 supports the other end of each of the spring structures 11. Each of the other ends of the pair of conducting wires in the spring structure 21 penetrates the support member 23.

The plug 24 is provided for the support member 23. This plug 24 has a pair of connection portions 24*a* in the inside thereof. One end of one of the connection portions 24*a* is connected to the other end of one of the conducting wires, the other end penetrating the support member 23. Further, one end of the other connection portion 24*a* is connected to the other end of the other conducting wire, the other end penetrating the support member 23.

On the other hand, the socket 25 is provided for the one end of the cable 61. This socket 25 has a pair of connection portions 25*a*. The pair of connection portions 25*a* are provided in the inside of a receptacle of the socket 25.

The plug 24 can be inserted into the receptacle of the socket 25. Further, the one of the connection portions 24*a* and one of the connection portions 25*a* can be in contact with each other. On the other hand, the other connection portion 24*a* and the other connection portion 25*a* can be in contact with each other.

More specifically, when the plug 24 is inserted into the inside of the socket 25, the pair of connection portions 24*a* in the plug 24 are in contact with the pair of respective connection portions 25*a* in the socket 25. In contrast with this, when the plug 24 is withdrawn from the inside of the socket 25, the spring structure 21 enters a state in which the spring structure is mechanically and electrically connected to the board 41 while enters a state in which the spring structure is not mechanically and electrically connected to the cable 61.

At the time of insertion of the plug 24 into the socket 25, when a vibration occurs in a housing 43 and the vibration propagates from the housing 43, via the spring structure 21, toward the cable 61, the vibration is attenuated by the elastic deformation of the spring structure 21. On the other hand, at the time of insertion of the plug 24 into the socket 25, when a vibration occurs in the cable 61 and the vibration propagates from the cable 61, via the spring structure 21, toward the housing 43, the vibration is attenuated by the elastic deformation of the pair of conducting wires in the spring structure 21.

Here, a pair of transmission lines are formed between the board 41 and the cable 61, as can be seen clearly from the above-mentioned explanation. One of the transmission lines is constituted by one of the electric wires 51 in the cable 61, the one of the conducting wires in the spring structure 21 and the one of the wiring patterns 42 in the board 41. The other transmission line is constituted by the other electric wire 51 in the cable 61, the other conducting wire in the spring structure 21 and the other wiring pattern 42 in the board 41.

When currents flow through the pair of conducting wires in the spring structure 21 in the same direction, the conducting wires mutually strengthen their respective magnetic fields caused by the currents flowing through the conducting wires. Therefore, a noise occurring from the board 41 or the cable 61 is removed by the inductance component of each of the conducting wires. The above-mentioned noise is referred to as a so-called common mode noise.

As mentioned above, in the connector 20 according to Embodiment 2, the spring structure 21 is constituted by the pair of conducting wires wound spirally and alternately each other. The one ends of the pair of conducting wires are connected to the pair of respective wiring patterns 42 provided on the board 41. The other ends of the pair of conducting wires are connected to the pair of respective electric wires 51 contained in the single cable 61. The pair of conducting wires are provided coaxially and in the same winding direction, and an insulator is provided on each of the outer peripheral surfaces of the pair of conducting wires. Therefore, the connector 20 can achieve both the absorption of vibrations and the removal of common mode noises using the single spring structure 21.

Further, in the connector 20, the insulator provided on each of the outer peripheral surfaces of the pair of conducting wires in the spring structure 21 has elasticity. Therefore, even though the pair of conducting wires in the spring structure 21 be elastically deformed, the insulator can follow the elastic deformation.

Embodiment 3

A connector 30 according to Embodiment 3 will be explained using FIG. 7. Components having the same functions as those of components explained in the connector 20 according to Embodiment 2 are denoted by the same reference signs, and an explanation of the components will be omitted.

Figure 7:
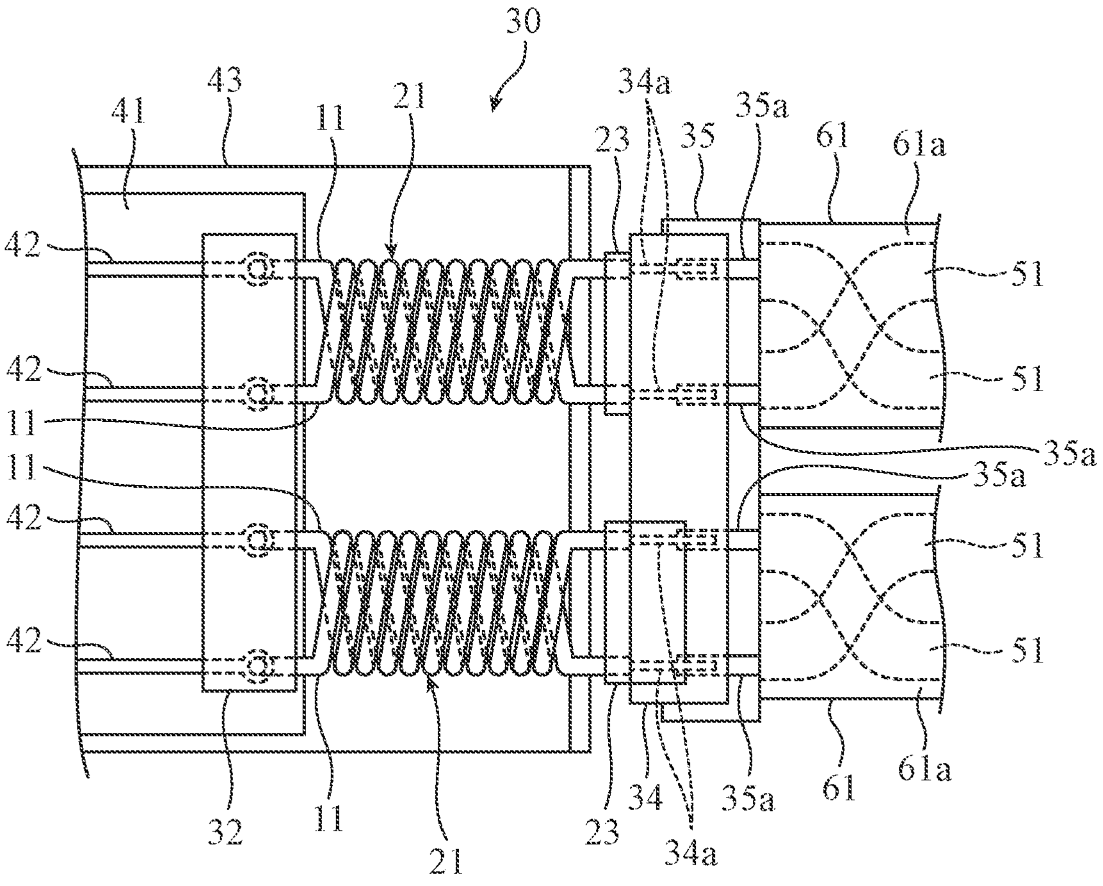
FIG. 7 is a plane view showing the configuration of a connector according to Embodiment 3.

FIG. 7 is a plane view showing the configuration of the connector 30 according to Embodiment 3.

As shown in FIG. 7, the connector 30 according to Embodiment 3 electrically connects a single board 41 and multiple cables 61 by means of the same number of transmission lines as the number of cables 61, for example. One end of the connector 30 is mechanically and electrically connected to the board 41, and the other end of the connector 30 is mechanically and electrically connected to the cables 61. FIG. 7 shows an example in which the number of cables 61 is two.

When one pair of wiring patterns 42 are defined as one set, the board 41 has two sets of wiring patterns. These wiring patterns 42 are arranged in parallel. Further, to one ends of the two cables 61 is provided a single socket 35.

The connector 30 includes two spring structures 21, a single support member 32, two support members 23, a single plug 34, and the single socket 35.

The two spring structures 21 are arranged in parallel. These spring structures 21 are supported between the support member 32 and the support members 23. The number of installed spring structures 21 is the same as the number of sets of pair of wiring patterns 42 and the number of cables 61.

The support member 32 constitutes a one end side support member. This support member 32 is formed of, for example, an insulator. The support member 32 supports each of one ends of a pair of conducting wires in each of the spring structures 21. Each of the one ends of the pair of conducting wires in each of the spring structures 21 penetrates the support member 32.

Further, the support member 32 is fixed to an upper surface of the board 41 in such a way as to cover each of one ends of the two sets of wiring patterns 42. Then, one end of one of the conducting wires in each of the pairs, the one end penetrating the support member 32, and one end of one of the wiring patterns 42 in each of the sets, the one end being covered by the support member 32, are connected. On the other hand, one end of the other conducting wire in each of the pairs, the one end penetrating the support member 32, and one end of the other wiring pattern 42 in each of the sets, the one end being covered by the support member 32, are connected.

One of the support members 23 supports each of the other ends of the pair of conducting wires in one of the spring structures 21. The other support member 23 supports each of the other ends of the pair of conducting wires in the other spring structure 21. Each of the other ends of the pair of conducting wires in the one of the spring structures 21 penetrates the one of the support members 23. Each of the other ends of the pair of conducting wires in the other spring structure 21 penetrates the other support member 23.

The plug 34 is provided in such a way as to cross over the two support members 23. When one pair of connection portions 34*a* are defined as one set, this plug 34 has two sets of connection portions in the inside thereof. Each of one ends of one of the sets of connection portions 34*a* is connected to the other ends of the pair of conducting wires, the other ends penetrating the one of the support members 23. Each of one ends of the other set of connection portions 34*a* is connected to the other ends of the pair of conducting wires, the other ends penetrating the other support member 23.

In contrast with this, the socket 35 is provided in such a way as to cross over the one ends of the two cables 61. When one pair of connection portions 35*a* are defined as one set, this socket 35 has two sets of connection portions. The connection portions 35*a* in each of the sets is provided in a receptacle of the socket 35.

The plug 34 can be inserted into the receptacle of the socket 35. Further, the one of the sets of connection portions 34*a* and the one of the sets of respective connection portions 35*a* can be in contact with each other. On the other hand, the other set of connection portions 34*a* and the other set of respective connection portions 35*a* can be in contact with each other.

More specifically, when the plug 34 is inserted into the inside of the socket 35, the two sets of connection portions 34*a* in the plug 34 are connected to the two sets of respective connection portions 35*a* in the socket 35. In contrast with this, when the plug 34 is withdrawn from the inside of the socket 35, the two spring structures 21 enter a state in which the spring structures are mechanically and electrically connected to the single board 41 while enters a state in which the spring structures are not mechanically and electrically connected to the two cables 61.

As mentioned above, in the connector 30 according to Embodiment 3, the same number of spring structures 21 each of which is constituted by a pair of conducting wires wound spirally and alternately each other are provided as the number of sets of wiring patterns 42 when one pair of wiring patterns are defined as one set, and as the number of cables 61. Therefore, the connector 30 can achieve both the absorption of vibrations and the removal of common mode noises even using the multiple spring structures 21.

It is to be understood that an arbitrary combination of two or more of the above-mentioned embodiments can be made, various changes can be made in an arbitrary component in each of the above-mentioned embodiments, or an arbitrary component in each of the above-mentioned embodiments can be omitted within the scope of the present disclosure.

INDUSTRIAL APPLICABILITY

The connector according to the present disclosure can achieve both the absorption of vibrations and the removal of noises by including a spring structure constituted by a conducting wire wound spirally, and thus is suitable for use as a connector and so on.

REFERENCE SIGNS LIST

10, 20, 30 connector, 11, 21 spring structure, 12, 13, 22, 23, 32 support member, 14, 24, 34 plug, 15, 25, 35 socket, 14*a*, 15*a*, 24*a*, 25*a*, 34*a*, 35*a* connection portion, 41 board, 42 wiring pattern, 43 housing, 51 electric wire, 51*a* signal line, 51*b* insulator, 61 cable, and 61*a* sheath.

The invention claimed is:

1. A connector comprising:

a first spring structure having:

a first conducting wire wound spirally and having a spring property and an inductance component;

a second conducting wire wound spirally and having a spring property and an inductance component, the second conducting wire being wound alternately and coaxially in a same winding direction with respect to the first conducting wire;

a first support member supporting a first end of the first conducting wire and a first end of the second conducting wire, and configured to connect the first end of the first conducting wire and the first end of the second conducting wire to separate wiring patterns provided on a board; and a second support member supporting a second end of the first conducting wire, opposite to the first end of the first conducting wire, and a second end of the second conducting wire opposite to the first end of the second conducting wire, to electrically connect the second end of the first conducting wire and the second end of the second conducting wire to separate electric wires contained in a single cable, wherein an insulator is provided on an outer peripheral surface of each of the first and second conducting wires.

2. The connector according to claim 1, wherein the insulator has elasticity.

3. The connector according to claim 1, further comprising:

a second spring structure including:

a third conducting wire wound spirally and having a spring property and an inductance component; and a fourth conducting wire wound spirally and having a spring property and an inductance component, the fourth conducting wire being wound alternately and coaxially in a same winding direction with respect to the third conducting wire;

wherein the wiring patterns and the single cable are provided for each of the first spring structure and the second spring structure.

4. The connector according to claim 1, further comprising:

a plug provided for the second support member and connected to the second end of the first conducting wire and the second end of the second conducting wire; and a socket which is provided for the separate electric wires and into which the plug can be inserted.

* * * * *